United States Patent [19]
Poulin et al.

[11] Patent Number: 5,151,199
[45] Date of Patent: Sep. 29, 1992

[54] PROCESS AND APPARATUS FOR CONTROLLING FROTH OF AN INSTANT COFFEE BEVERAGE

[75] Inventors: Jean-Marc Poulin, Chavornay; Hervé Schmidely, Monthey, both of Switzerland

[73] Assignee: Nestec S.A., Vevey, Switzerland

[21] Appl. No.: 550,456

[22] Filed: Jul. 10, 1990

[30] Foreign Application Priority Data

Jul. 21, 1989 [CH] Switzerland .................. 2738/89

[51] Int. Cl.⁵ ............................................ B01D 29/085
[52] U.S. Cl. .................................. 210/773; 210/800; 210/481; 210/489; 210/497.3; 210/499; 99/323.3; 426/80; 426/433
[58] Field of Search ............... 210/315, 316, 481, 489, 210/497.3, 499, 773, 800; 99/295, 298, 323.1, 323.3, 287; 426/77, 79, 80, 433, 470, 569, 595, 599

[56] References Cited

U.S. PATENT DOCUMENTS

| | | | |
|---|---|---|---|
| 664,280 | 12/1900 | Leland | 210/499 |
| 1,458,464 | 6/1923 | Byers | 210/499 |
| 1,905,350 | 4/1933 | Page | 210/477 |
| 1,977,818 | 10/1934 | Brodersen | 210/497.3 |
| 2,123,054 | 7/1938 | Lamb et al. | 426/80 |
| 2,321,220 | 6/1943 | Lieberman | 210/489 |
| 3,292,527 | 12/1966 | Stasse | 426/77 |
| 4,136,202 | 1/1979 | Favre | 426/77 |
| 4,287,067 | 10/1981 | Dyner | 210/499 |
| 4,465,697 | 8/1984 | Brice et al. | 426/79 |
| 4,721,567 | 1/1988 | Uram | 210/489 |
| 4,830,869 | 5/1989 | Wimmers et al. | 426/595 |
| 4,954,251 | 9/1990 | Barnes et al. | 210/489 |
| 5,008,013 | 4/1991 | Favre et al. | 210/482 |

FOREIGN PATENT DOCUMENTS 0323592 7/1989 European Pat. Off. .

Primary Examiner—Robert A. Dawson
Assistant Examiner—W. L. Millard
Attorney, Agent, or Firm—Vogt & O'Donnell

[57] ABSTRACT

Bubble size of a froth created during the preparation and dispensing of an instant coffee beverage is controlled by passing the coffee beverage through at least two adjacent screens coaxially and adjacently positioned at a distance from one another, one inside another.

19 Claims, 2 Drawing Sheets

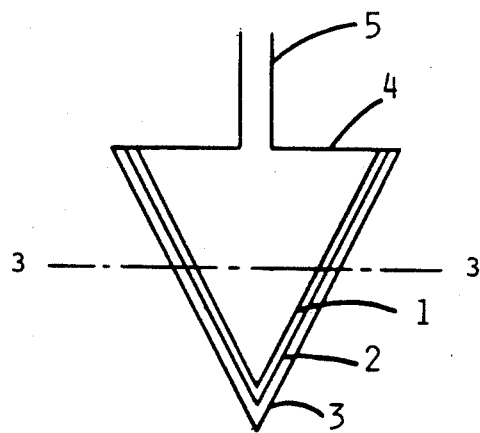
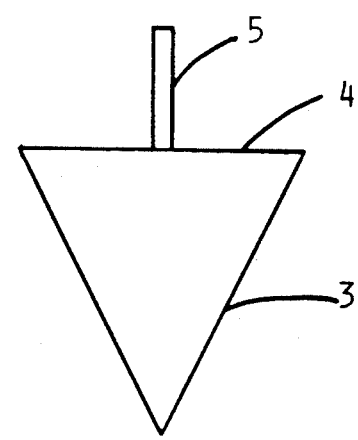
FIG. 1     FIG. 2
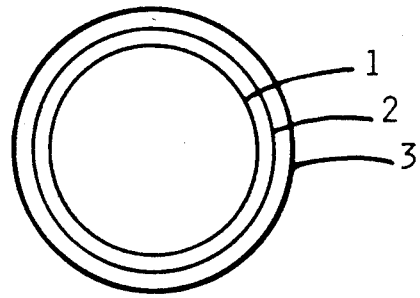
FIG. 3
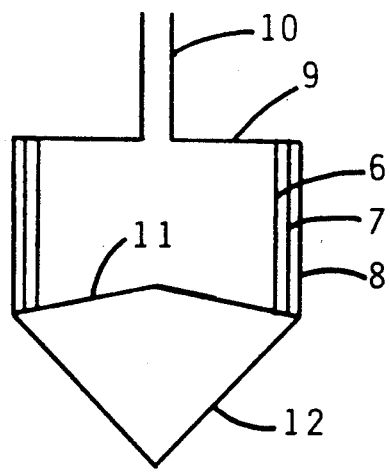
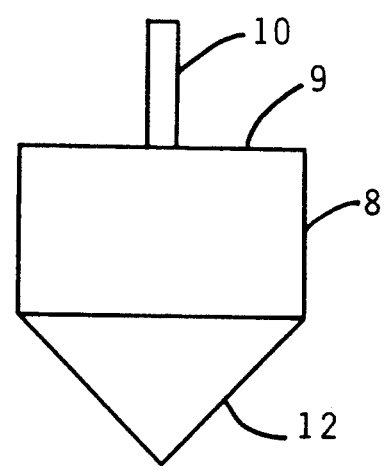
FIG. 4     FIG. 5

PROCESS AND APPARATUS FOR CONTROLLING FROTH OF AN INSTANT COFFEE BEVERAGE

BACKGROUND OF THE INVENTION

This invention relates to an apparatus and process for making and dispensing an instant coffee beverage.

Among the various known filter units, there are the filters used in the field of domestic plumbing. These filters are in the form of cylinders of which the cross-section is interrupted by several horizontally superposed, circular screens which cross one another. These horizontal screens break the jet of running water and make the water more foamy by introducing air into it. Unfortunately, filters such as these have the disadvantage that their cylindrical shape does not provide for rapid flow of the liquid.

In the operation of a conventional automatic distributor for instant coffee, a certain quantity of coffee drops into a mixing bowl in which the necessary quantity of hot water then arrives. A stirrer positioned in the mixing bowl mechanically agitates the water and the coffee, as a result of which the coffee dissolves completely and the mixture undergoes an increase in volume. This phenomenon of expansion results in the formation of a froth which is deposited on the surface of the coffee when it is poured into a cup. The froth formed during this process is coarse and can contain a considerable number of large air bubbles visible on the surface of the coffee. This froth, which is characteristic of instant coffee, can have an unfavourable effect on the consumer by comparison with the fine, creamy froth of an espresso coffee.

SUMMARY OF THE INVENTION

The object of the present invention is to obviate this disadvantage and to provide an apparatus and process which enable a fine, creamy froth of favourable appearance entirely comparable with the froth of a typical espresso coffee to be obtained on the surface of a cup of instant coffee.

To this end, the apparatus and process according to the invention are characterized in that they employ use of a froth controlling device comprising at least two screens in the form of bags which are fitted into one another. This froth controlling device is designed to be placed at the lower end of the flow tube leading out of the mixing bowl, i.e., at the outlet of the distributor.

It has surprisingly been found that the use of such a device enables the coarse air bubbles present in the froth to be burst and a fine and creamy froth to be obtained without excessively reducing the flow rate of the coffee issuing from the distributor.

Thus, the apparatus according to the present invention comprises a mixing bowl and stirrer for mixing water and instant coffee to prepare a coffee beverage, a flow tube connected to the mixing bowl for receiving the coffee beverage from the mixing bowl, and a froth controlling device comprising at least two screens, each screen being in the form of a bag and having an open base and a closed end, the screens being coaxially and adjacently positioned at a distance from one another, one inside another, for receiving the coffee beverage from the flow tube through their open bases.

The process according to the present invention comprises mixing water and instant coffee to prepare a coffee beverage and then passing the coffee beverage through at least two screens, each screen being in the form of a bag and having an open base and a closed end, the screens being coaxially and adjacently positioned at a distance from one another, one inside another, for controlling bubble size of a froth on a surface of the beverage.

One advantage of the invention is that the shape of the froth controlling screens promotes the flow of coffee out of the distributor and into the cup. Another advantage is that it eliminates the need to rinse the flow tube filled with the froth before each use. A further advantage is that it enables a significant pressure and, hence, flow rate to be used in the distributor.

DETAILED DESCRIPTION OF THE INVENTION

A froth of the espresso type may be characterized in particular by its volume, its mass, its consistency, its stability, the size of any large bubbles and its colour. These characteristic differences generally depend on two types of factors:

the starting materials used, such as water, coffee, additives, the physical conditions used, such as the temperature and flow rate of the water, the agitation, the diameter and length of the flow tube, the height of fall.

In the practical application of the apparatus and process according to the invention, it is preferable to have a consistent and abundant froth before filtration. The froth formed in the mixing bowl should have enough consistency not to dissolve during its flow in the tube and its passage through the device and not to collapse too rapidly once on the surface of the coffee in the cup. The froth should also be present in a sufficient quantity to cover the entire surface of the coffee in the cup.

The consistency and abundance of the froth may be influenced by the number and size of the large air bubbles included in the froth during its formation. These large bubbles can cause a reduction in the stability of the froth, i.e., a more accentuated tendency to collapse and dissolve in the coffee. The size and number of the large air bubbles included in the froth during its formation can be reduced through the various physical conditions used.

The temperature of the water determines the temperature of the coffee issuing from the distributor. Since the temperature of the coffee is preferably between 55° C. (below which the coffee is considered to be cold) and 75° C., the water may be at a temperature between 60° and 95° C. and preferably between 80° and 85° C.

The rate at which the coffee flows out of the distributor should be high enough to enable the coffee to flow rapidly into the cup. This flow rate may be between 2 and 35 ml per second and preferably between 10 and 14 ml per second.

The stirring time in the mixing bowl should be sufficient to ensure complete dissolution of the soluble coffee in the water and to allow the formation of a creamy froth, but should not be too long in order to avoid the formation of an excessive number of overly large air bubbles in the froth. Stirring may be carried out by a mixer turning at 8,000 to 10,000 revolutions per minute over a period of 3 to 15 seconds and preferably 5 to 9 seconds.

The flow tube at the outlet of the mixing bowl may have a length of 10 to 60 cm and preferably 15 to 25 cm and a diameter of 3 to 15 mm and preferably 6 to 10 mm.

Another factor which may be considered as important is the height of fall, i.e., the distance between the lower end of the unit and the surface of the coffee in the cup. The height of fall affects only the quantity of large air bubbles present in the froth. If the height of fall is minimal, i.e., of the order of 20 mm, the froth obtained is very fine and contains very few large bubbles. If it is greater, i.e., of the order of 100 mm, the froth is still fine, but contains a larger number of large bubbles. The height of fall may be between 1 and 100 mm and preferably between 20 and 50 mm.

In the context of the invention, a screen is understood to be made up from wires which cross one another, preferably perpendicularly to one another. The mesh width of the screen, i.e., the elementary space defined by four wires, may vary according to the diameter of the wires used and their spacing. The mesh width should be narrow enough to enable large air bubbles to be burst and a fine froth to be obtained without, at the same time, reducing the flow rate of the coffee during its passage through the filter unit. The screen preferably consists of wires 0.08 to 0.20 mm in diameter spaced at intervals of 0.10 to 0.50 mm which thus define a mesh width of 0.02 to 0.42 mm. The screens may be in the form of any type of bag so that they are capable of fitting in one another. More particularly, they may be in the form of conical bags or cones or in the form of cylindrical bags. If they are in the form of conical bags, the screens may be arranged coaxially and may have diameters and heights decreasing from the outside to the inside of the unit. If they are in the form of cylindrical bags, the screens may be arranged coaxially and may be substantially equal in height, but decrease in diameter from the outside to the inside of the unit.

To make a screen in the form of a conical or cylindrical bag, the corresponding geometric shape (for example a rectangle for the cylindrical, a trapezium for the cone) may be cut out from a screen, the screen thus cut out may be brought into shape and then joined at its ends by bonding, welding, sealing or other method. The screens which form the froth controlling device according to the invention may be variable in number. There should be a sufficient number of screens to ensure good filtration of the froth and to enable any large air bubbles to be burst without, at the same time, reducing the flow rate of the coffee issuing from the distributor. The froth controlling device according to the invention preferably comprises 2 to 6 screens.

The distance between each screen can affect the effectiveness of filtration. To ensure that each screen provides for optimal filtration independently of the others, it is preferably separated from the adjacent screens by a sufficient distance. This should ensure that the screens do not adhere to one another if they are too close or that the froth does not collapse between each screen if the screens are too far apart. The distance between adjacent screens may be, for example, between 0.5 and 4 mm and is preferably between 1.5 and 2.5 mm.

The screens which form the apparatus according to the invention may be joined at their upper ends to a cover. This cover may be in the form of a disk of minimal thickness which is preferably provided at its centre with means for introducing the liquid to be filtered, for example in the form of a cylindrical, preferably screwthreaded nozzle to which the flow tube leading out from the distributor may be connected. The cover may be joined to the screens by sealing, welding, bonding or by any other method.

In the embodiment comprising screens in the form of cylindrical bags, the device according to the invention may additionally comprise a distributor cone. This cone, which is preferably solid, may be arranged with its tip facing downwards beneath the lower ends of the screens. Its function is to collect the filtered coffee into a single continuous stream as it runs over the cone. The base of the distributor cone may be convex, i.e. slightly dished, conical or stepped in order better to distribute the incoming liquid towards the filtering screens.

The screens, the cover and the distributor cone may be made of metal, polyester, polyethylene, polyvinyl chloride or Teflon or of any other material compatible with foods and capable of withstanding a temperature of 100° C.

In the embodiment comprising screens in the form of conical bags or cones, the outer screen may preferably have a diameter at the base of the cone of 20 to 50 mm, a height of 10 to 40 mm and an apex angle of the cone of 30° to 120°.

The circular cover may have a diameter of 20 to 55 mm, preferably equal to the diameter of the base of the outer cone.

In the embodiment comprising screens in the form of cylindrical bags, the outer screen may preferably have a diameter of 20 to 50 mm and a height of 8 to 20 mm. The distributor cone may preferably have an apex angle of 30° to 120° and a diameter preferably equal to the diameter of the outer screen.

The present invention is described in more detail in the following with reference to the accompanying drawings.

BRIEF DESCRIPTION OF THE DRAWINGS

FIG. 1 is a longitudinal axial section through a first embodiment of the froth controlling device according to the invention.

FIG. 2 is a side view of the device shown in FIG. 1.

FIG. 3 is a section on the line 3—3 through the device shown in FIG. 1

FIG. 4 is a longitudinal section through a second embodiment of the froth controlling device according to the invention.

FIG. 5 is a side view of the device shown in FIG. 4.

Figure 6:
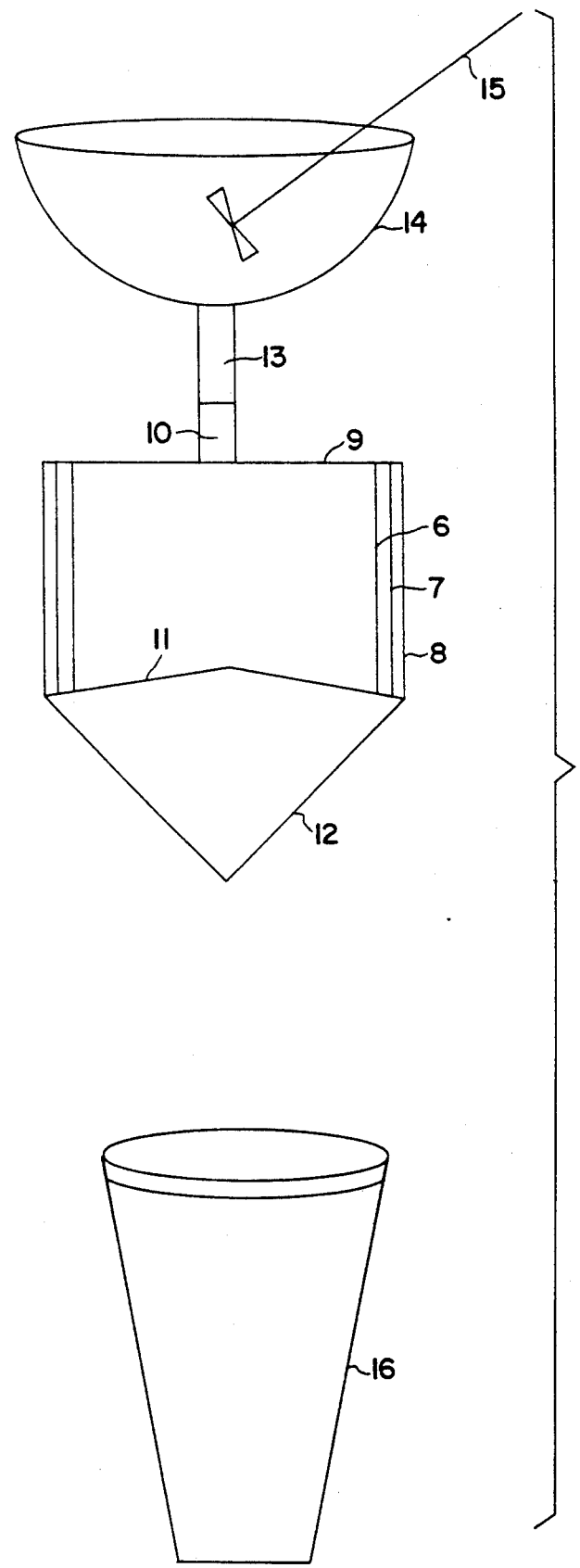
FIG. 6 illustrates the froth controlling device shown in FIG. 4 in an apparatus for making and dispensing an instant coffee beverage.

In the embodiment shown in FIGS. 1 to 3, the device according to the invention consists of a first screen in the form of a conical bag (1), or first filtering cone, fitted into a second screen in the form of a conical bag (2), or second filtering cone, which is slightly larger than the first and which is itself fitted into a third screen in the form of a conical bag (3), or third filtering cone, slightly larger than the second.

The three screens are superposed and fitted into one another so that the axes of revolution of the cones which they form are the same. The bases or upper ends of each of the filtering cones are joined to a circular cover (4) at least equal in diameter to the base of the largest cone, i.e., the cone forming the outer grill. The cover is provided at its centre with means for introducing the liquid to be filtered in the form of a screwthreaded cylindrical nozzle (5).

In the embodiment shown in FIGS. 4 and 5, the froth controlling device according to the invention consists of a first screen in the form of a cylindrical bag (6), or first filtering cylinder, fitted into a second screen in the form of a cylindrical bag (7), or second filtering cylinder, which is slightly larger in diameter than the first screen and which is itself fitted into a third screen in the form of a cylindrical bag (8), or third filtering cylinder, slightly larger in diameter than the second screen so that the three filtering cylinders have the same axis. The upper ends of the filtering cylinders are joined to a circular cover (9) of the same diameter as the outer cylinder and which is provided at its centre with means for introducing the liquid to be filtered, in the form of a screwthreaded cylindrical nozzle (10).

At their lower ends, the filtering cylinders are joined to the convex base (11) of a solid distributor cone (12), which directs the flow of the coffee issuing from the filtering cylinders into the cup.

FIG. 6 shows the froth controlling screen device illustrated in FIG. 4 together with additional apparatus for making and dispensing an instant coffee beverage. A cover (9) is joined to the open bases of the cylindrical screens (6, 7 and 8) and has an aperture therethrough for introducing the beverage from the flow tube to the screens. As illustrated, nozzle 10 is connected to the cover at the aperture and to an end of flow tube (13) displaced away from mixing bowl (14) to which flow tube (13) also is connected to receive coffee beverage from the bowl. A stirrer (15) is positioned in the mixing bowl for mixing instant coffee and water for preparing the beverage. A cup (16) is positioned beneath distributor cone (12) to receive a stream of coffee.

We claim:

1. In an apparatus for making and dispensing an instant coffee beverage comprising a mixing bowl and stirrer for mixing water and instant coffee to prepare a coffee beverage and a flow tube connected to the mixing bowl for receiving the coffee beverage from the mixing bowl, the improvement comprising:
   at least two screens positioned beneath an end of the flow tube displaced away from the bowl, each screen being in the form of a bag and having an open base and a closed end, the screens being coaxially and adjacently positioned at a distance from one another, one inside another, for receiving the coffee beverage from the flow tube through their open bases.

2. An apparatus according to claim 1 wherein the screens are cylindrical in shape.

3. An apparatus according to claim 2 further comprising a distribution cone positioned beneath the cylindrical screens for collecting the coffee beverage passing through the screens into a continuous stream, the distribution cone having a tip positioned away from the ends of the screens.

4. An apparatus according to claim 1 further comprising a cover joined to the screen bases and having an aperture therethrough for introducing the beverage from the flow tube to the screens.

5. An apparatus according to claim 4 further comprising a nozzle connected to the flow tube end displaced away from the bowl and connected to the cover aperture for introducing the beverage from the flow tube to the screens.

6. An apparatus according to claim 1 wherein adjacent screens are positioned from one another at a distance of from 0.5 mm to 4 mm.

7. An apparatus according to claim 6 wherein adjacent screens are positioned from one another at a distance of from 1.5 mm to 2.5 mm.

8. An apparatus according to claim 1 wherein the screens are conical in shape.

9. An apparatus according to claim 1 wherein there are from 2 to 6 screens.

10. An apparatus according to claim 1 wherein the screens have a mesh width of from 0.02 mm to 0.42 mm.

11. A process for making an instant coffee beverage comprising:
    mixing water and instant coffee to prepare a coffee beverage; and
    passing the coffee beverage through at least two screens, each screen being in the form of a bag and having an open base and a closed end, the screens being coaxially and adjacently positioned at a distance from one another, one inside another, for controlling bubble size of a froth on a surface of the beverage.

12. A process according to claim 11 wherein adjacent screens are positioned from one another at a distance of 0.5 mm to 4 mm.

13. A process according to claim 12 wherein adjacent screens are positioned from one another at a distance of from 1.5 mm to 2.5 mm.

14. A process according to claim 11 further comprising collecting the coffee beverage passed through the screens in a cup, wherein the coffee falls a distance of from 1 mm to 100 mm between a lower end of the screens and the cup.

15. A process according to claim 14 wherein the coffee falls a distance of from 20 mm to 50 mm.

16. A process according to claim 11 wherein the screens are conical.

17. A process according to claim 11 wherein the screens are cylindrical.

18. A process according to claim 11 wherein the coffee beverage is passed through 2 to 6 screens.

19. A process according to claim 11 wherein the screens have a mesh width of from 0.02 mm to 0.42 mm.

* * * * *

UNITED STATES PATENT AND TRADEMARK OFFICE
CERTIFICATE OF CORRECTION

PATENT NO. : 5,151,199

DATED : September 29, 1992

INVENTOR(S) : Jean-Marc POULIN, et al.

It is certified that error appears in the above-identified patent and that said Letters Patent is hereby corrected as shown below:

Column 4, between lines 47 and 48, insert --DETAILED DESCRIPTION OF THE DRAWINGS--.

Column 4, line 48, after "the", insert --froth controlling--.

Signed and Sealed this

Twenty-first Day of September, 1993

Attest:

BRUCE LEHMAN

*Attesting Officer*  *Commissioner of Patents and Trademarks*